United States Patent [19]
Gray

[11] Patent Number: 5,673,954
[45] Date of Patent: Oct. 7, 1997

[54] METHOD OF ASSEMBLING CARGO CONTAINERS

[76] Inventor: William H. Gray, 11080 Emmanuel Church Rd., Smithfield, Va. 23430

[21] Appl. No.: 711,099

[22] Filed: Sep. 9, 1996

[51] Int. Cl.$^6$ .................................................. B25J 1/04
[52] U.S. Cl. .................................... 294/1.1; 294/24
[58] Field of Search ........................... 294/1.1, 11, 19.1, 294/22–24; 29/270, 278, 281.1, 281.4, 283; 81/52, 53.1, 53.11, 53.12, 478, 480, 487, 488; 414/786

[56] References Cited

U.S. PATENT DOCUMENTS

| | | | |
|---|---|---|---|
| 678,898 | 7/1901 | O'Carroll | 294/22 |
| 3,469,878 | 9/1969 | De Haan | 294/19.1 |
| 3,514,145 | 5/1970 | Elgin et al. | 294/19.11 X |
| 3,627,367 | 12/1971 | Levy | 294/19.11 X |
| 4,004,834 | 1/1977 | Podpaly | 294/19.1 |
| 4,075,913 | 2/1978 | Tye | 294/19.1 X |
| 4,148,234 | 4/1979 | Steimle | 294/19.1 X |
| 4,586,741 | 5/1986 | Muti | 294/19.1 |
| 4,863,204 | 9/1989 | Peters | 294/19.1 |
| 5,390,970 | 2/1995 | Gray | 294/19.1 |
| 5,516,171 | 5/1996 | Gray | 294/24 |
| 5,566,998 | 10/1996 | Gray | 294/24 |

FOREIGN PATENT DOCUMENTS

| 853340 | 10/1952 | Germany | 294/19.1 |
|---|---|---|---|

*Primary Examiner*—Johnny D. Cherry
*Attorney, Agent, or Firm*—Griffin, Butler, Butler, Whisenhunt

[57] ABSTRACT

A method of making an assemblage of cargo containers includes use of a self-locking swivel stacking pin tool (10) with an elongated handle (12) having a handgrip (18) at a hand end thereof and a pin-housing engaging member (20) at a pin end thereof. A locking-head actuator (14) having an elongated force-transmittal portion (46) slidably extends along an elongated shaft (16) of the elongated handle, with a trigger (48) at a hand end thereof and a locking-head rotator (50) at a pin end thereof for engaging a bottom swivel locking head (38). By moving the trigger relative to the handgrip an operator can cause a rotatable axle (40) of a swivel stacking pin to rotate and thereby cause a top swivel locking head (36) to rotate and align with a top housing insert section (28) so that the top swivel locking head and the top housing insert section can be inserted into a hole (13a) of a second cargo container (13) by manipulation of the swivel stacking pin tool. The second cargo containers can then be assembled on a first cargo container.

20 Claims, 3 Drawing Sheets

METHOD OF ASSEMBLING CARGO CONTAINERS

BACKGROUND OF THE INVENTION

This invention relates to cargo container handling in general, and specifically to use of a tool to assist a longshoreman in inserting self-locking swivel stacking pins employed in making containerized cargo assemblages.

The use of container ships to transport containerized cargo has become one of the primary means for shipping. Standard size containers and pier-side crane systems substantially increase productivity while reducing manpower required, and hazards incurred, in loading and unloading freight transporting ships. Cargo containers are provided with metal reinforcing corners at top and bottom surfaces thereof. These metal reinforced corners provide attachments for turnbuckle attached tie-down cables and are provided with openings through flat steel plates therein to receive latches on spreader mechanisms of cranes for lifting and positioning the containers on board ships or on pier-side docks. In the prior art, after a first container had been positioned by a crane operator, a longshoreman "latcher" released the spreader mechanism from the first, or bottom, container and a second longshoreman "stacking pin installer" normally placed individual stacking pins in the plates of each of the first container's exposed upper reinforced corners to permit stacking of a second container onto the first container. After the second container had been stacked thereon, a lever of each of the stacking pins had to be rotated to lock the first and second containers together. Similarly, when the second container was removed from the first container, the stacking pin levers had to be rotated to unlock the containers.

Such stacking pins served to support the entire weight of the second "stacked" container in spaced relationship over the first container with a space therebetween permitting passage of tie-down cables. These stacking pins have varied in structural shape and from ship-to-ship, and have, in the past, normally been 6–10 inches in length and weighed up to 20 pounds or more each.

U.S. Pat. No. 5,390,970 to William H. Gray discloses a shipping container stacking pin tool for inserting such stacking pins without the use of ladders in first containers. In this regard, prior to the Gray invention, the stacking pins were placed in first containers by hand using ladders.

Although the Gray invention simplified placement of stacking pins for first containers, it did very little for such pin placement for second, third and fourth containers in a stack. Thus, it was still often necessary for workers to "ride the spreader bar" on cranes to install and remove pins, which was somewhat dangerous and time consuming.

Now, a new type of stacking pin, a self-locking swivel stacking pin, has been developed which can be inserted at the bottom of a container. That is, a first, or bottom, container is put in place without stacking pins at bottom or top corners thereof. A second container, which is to be placed on the first container, is then lifted by a crane and a "stacking pin installer" inserts the self-locking swivel stacking pins at the bottom corners of the thusly lifted second container. Each of the self-locking, or automatic, swivel stacking pins has a pin housing with a spacer section and top and bottom insert sections on opposite sides the spacer section, top and bottom swivel locking heads respectively adjacent the top and bottom insert sections, and a rotatable axle rigidly attached to the top and bottom swivel locking heads and passing through the housing. The top and bottom insert sections are rectangular in shape so that they match rectangular holes in the corner plates of the containers. The top and bottom insert sections and the top and bottom swivel locking heads are elongated in a direction perpendicular to an axis of the rotatable axle. A biasing spring in the housing normally biases the top and bottom locking heads, via the axle, to be rotated so that they do not align with their respective top and bottom insert sections and the top and bottom locking heads are attached to the rotatable axle so that they do not align with one another. The biasing spring is one of the features that makes these swivel stacking pins self-locking, or automatic. A tether-type hand-crank mechanism is provided to allow an operator to counter the biasing spring, thereby rotating the axle to place the top swivel locking head parallel with its respective insert section. Once the operator has done this, he can insert the top swivel locking head and top insert section into a hole of the plate at the lower edge of the second container. Using the hand-crank mechanism, the operator then allows the swivel locking head to rotate (due to the biasing spring in the housing) so that it is no longer aligned with its insert section, to thereby latch, or lock, the self-locking swivel stacking pin on the container. After four such pins are placed at the second container's lower edge, the second container is lifted above the first container and the stacking pins, which are mounted on the second container, are aligned with the rectangular holes at top corners of the first container. The second container is then lowered so that the bottom swivel locking heads of the swivel stacking pins engage edges defining the holes in the first container's top corner plates and these bottom swivel locking heads, due to their shape, automatically rotate to align with their respective bottom insert sections. In doing this, they do not cause the top locking heads to align with the top insert sections. Once the lower swivel locking heads pass through the first container's holes, the biasing springs in the housings automatically rotate the axles back to their home positions with both top and bottom swivel locking heads being locked onto their respective containers. This automatic locking procedure can also be used for stacking the third, fourth and fifth containers without the necessity of a worker "riding the spreader bar" on the crane.

In this position, for unlocking, the hand-crank mechanisms must be reached for rotating the axles and thereby unlocking the swivel stacking pins from the containers when this is desirable.

Although these new self-locking swivel stacking pins have many benefits over earlier stacking pins for container stacks higher than two containers, they have the detriment that when a "stacking pin installer" is installing one of them he is standing directly under a lifted (second, third, etc.) container, which is extremely dangerous. Further, when a self-locking swivel stacking pin is not mounted on a container, it is difficult to operate its hand-crank mechanism for rotating its axle and the attached swivel locking heads. Still further, the self-locking swivel locking pins are quite awkward in shape and extremely heavy (up to 20 pounds or more) and therefore difficult for an operator to grip, actuate, and install.

Because of the above problems, it is an object of this invention to provide a cargo-container method for picking up self-locking swivel stacking pins from a deck, or the ground, with a swivel stacking pin tool and rotating the top and bottom swivel locking heads thereof while manipulating them for inserting them into container corner plates. Further, it is an object of this invention to provide such a method of assembling cargo containers which allows an operator to install a self-locking swivel stacking pin without placing his hand or body immediately below a raised container.

SUMMARY OF THE INVENTION

According to principles of this invention, assemblages of cargo containers are made by a method employing use of a self-locking swivel stacking pin tool. The self-locking swivel stacking pin tool comprises an elongated handle having a handgrip at a hand end thereof and a pin-housing engaging member at a pin end thereof for engaging a bottom insert section of a housing of a swivel stacking pin near its bottom swivel-locking head. The swivel stacking pin tool also includes a locking-head actuator having an elongated force-transmittal portion slidably extending along the elongated shaft, with a trigger attached to a hand end thereof and a locking head rotator attached to an opposite pin end thereof. The trigger is close to the handgrip and the locking-head rotator engages the bottom swivel locking head to allow an operator to manipulate the top and bottom swivel locking heads of the swivel locking pin via the trigger. Thus, an operator can manipulate the elongated handle to bring the pin-housing engaging member into engagement with a bottom insert section of the housing of the swivel stacking pin. The trigger can then be moved by the operator, using a hand on the handgrip, to cause the rotatable axle of the swivel stacking pin to rotate and thereby cause the top swivel locking head to rotate and align with the top housing insert section. The top swivel locking head and the top housing insert section can then be inserted into a hole of a second cargo container by manipulation of the swivel stacking pin tool. Thereafter, the second cargo container is mounted on a first cargo container.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
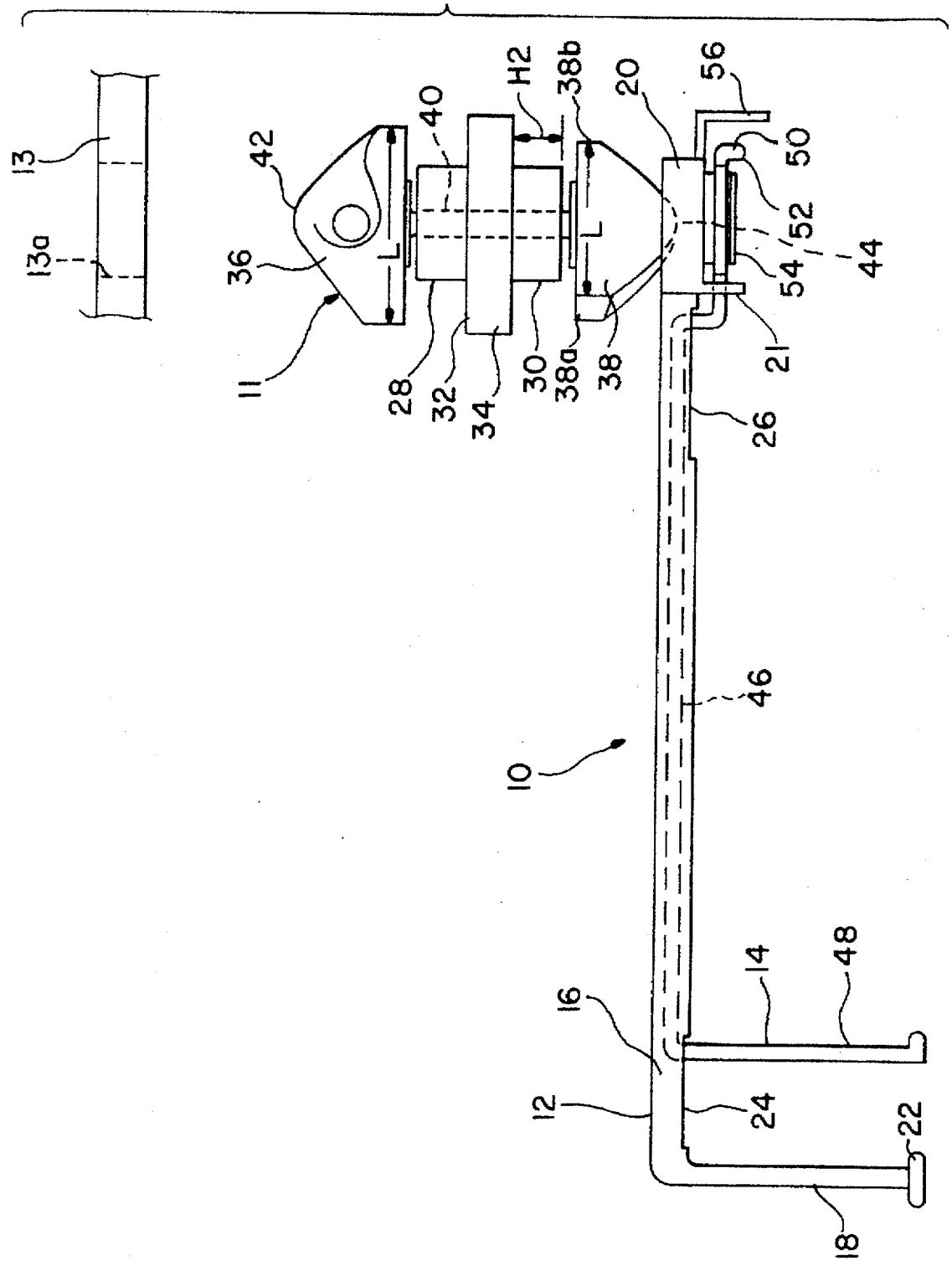
FIG. 1 is an exploded side view of a swivel stacking pin tool used in this invention, a self-locking swivel stacking pin and a corner plate of a container.

A swivel stacking pin tool 10 for manipulating a self-locking swivel stacking pin 11 into a container plate hole 13a of a container 13 comprises a rigid elongated handle 12 and a rigid elongated locking-head actuator 14, both preferably made of steel. The elongated handle 12 includes a tubularly-shaped elongated shaft 16 with a handgrip 18 at a hand end thereof and a pin-housing engaging member 20 at a pin end thereof. The handgrip 18 is a solid member which is welded to the hand end of the elongated shaft 16, which is tubularly shaped, and extends perpendicular thereto with an enlarge lobe 22 at its outer tip. The tubularly-shaped shaft 16 has a side trigger opening 24 and a side actuator opening 26, each aligned with the handgrip 18, with the trigger opening 24 being close to the handgrip 18 and the actuator opening 26 being close to the pin-housing engaging member 20.

Figure 2:
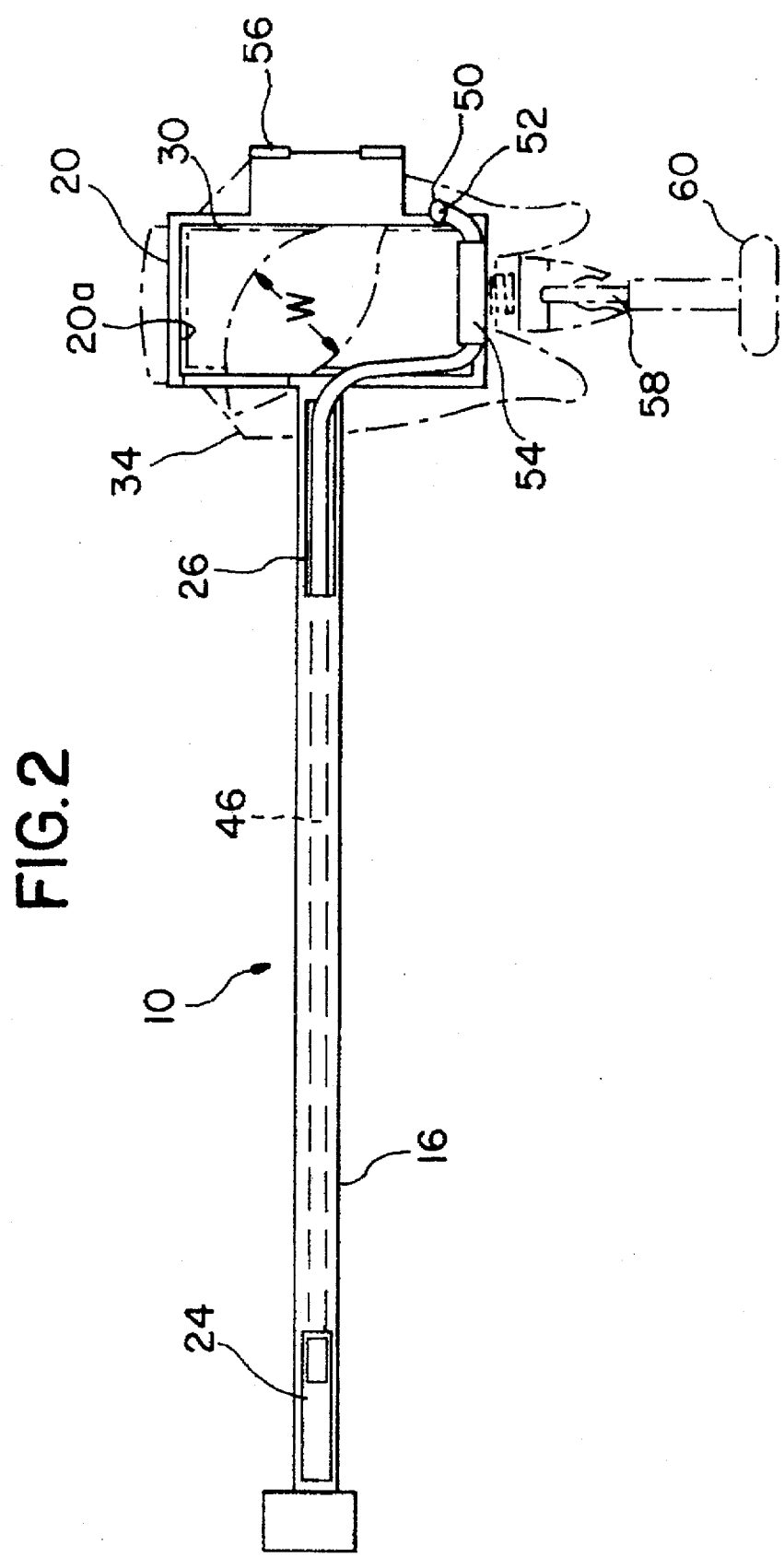
FIG. 2 is a bottom view of the swivel stacking tool of FIG. 1, with the self-locking swivel stacking pin of FIG. 1 being shown in phantom therein.
Figure 4:
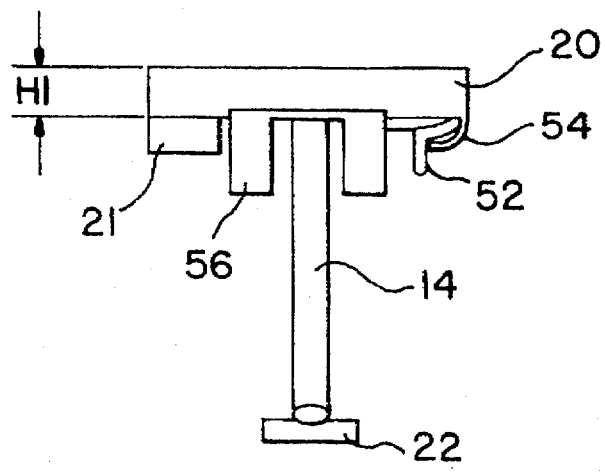
FIG. 4 is a view similar to FIG. 3 of the swivel stacking pin tool, but with the self-locking swivel stacking pin being removed.

The pin-housing engaging member 20, as can be seen in FIG. 2, is a rectangular frame which is open at the top and bottom (as viewed in FIG. 1). The size and shape of the rectangular frame of the pin-housing engaging member 20 is such that it will snugly fit on rectangular top and bottom insert sections 28 and 30 of a housing 32 of the self-locking swivel stacking pin 11. The top and bottom insert sections 28 and 30 of the swivel stacking pin 11, in turn, are shaped to snugly fit into container plate holes 13a. The pin-housing engaging member 20 includes a guiding protrusion 21 which extends downwardly therefrom and whose purpose will be described below. It is important that the height H1 (see FIG. 4) of the main portion of the pin-housing engaging member 20 is about the same as the height H2 (FIG. 1) of the bottom insert section 30.

Looking now in more detail at the self-locking swivel stacking pin 11, a housing 32 thereof comprises the rectangular top and bottom insert sections 28 and 30 and a larger spacer section 34, positioned between the top and bottom insert sections 28 and 30, to space containers into which the top and bottom insert sections 28 and 30 are inserted. The swivel stacking pin 11 further comprises top and bottom swivel locking heads 36 and 38 respectively on opposite sides of the housing 32 adjacent the respective top and bottom insert sections 28 and 30. The top and bottom swivel locking heads 36 and 38 are rigidly attached at opposite ends of a rotatable axle 40 which is mounted for rotation in the housing 32. The top and bottom swivel locking heads have lengths L, perpendicular to an axis of the axle 40, which are approximately the same as the lengths of the top and bottom insert sections 28 and 30, and widths W, which are also approximately the same as the widths of the top and bottom insert sections 28 and 30. The top and bottom swivel locking heads 36 and 38 have somewhat pointed top and bottom ends 42 and 44 to help guide them into container plate holes 13a.

Returning now to the description of the swivel stacking pin tool 10, the locking-head actuator 14 includes an elongated force-transmittal portion 46 slidably extending through a bore of the elongated shaft 16 of the elongated handle 12, a trigger 48 is attached to at a hand end of the force-transmittal portion 46 so as extend through the trigger opening 24 close to the handgrip 18, and a locking-head rotator 50 is attached to a pin end of the elongated force-transmittal portion 46 for engaging the bottom lower swivel locking head 38. As can be seen in FIGS. 1 and 2, the locking-head rotator 50 is bent to extend downwardly through the actuator opening 26 and then about an edge of the pin-housing engaging member 20 to a tip 52 of the locking-head rotator 50. The locking-head rotator 50 is supported at an end of the pin-housing engaging member 20 by a ledge 54 which is integral with the pin-housing engaging member 20. In one embodiment the elongated locking-head actuator is a single rigid member having bends to form the trigger 48 and the locking head rotator 50.

A bent with 56 having two prongs is integral with the pin-housing engaging member 20 (formed as one piece therewith) and is used by an operator for manipulating swivel stacking pins 11 on the ground or a deck to get them in proper positions as well as for other reasons as are stated below.

Figure 3:
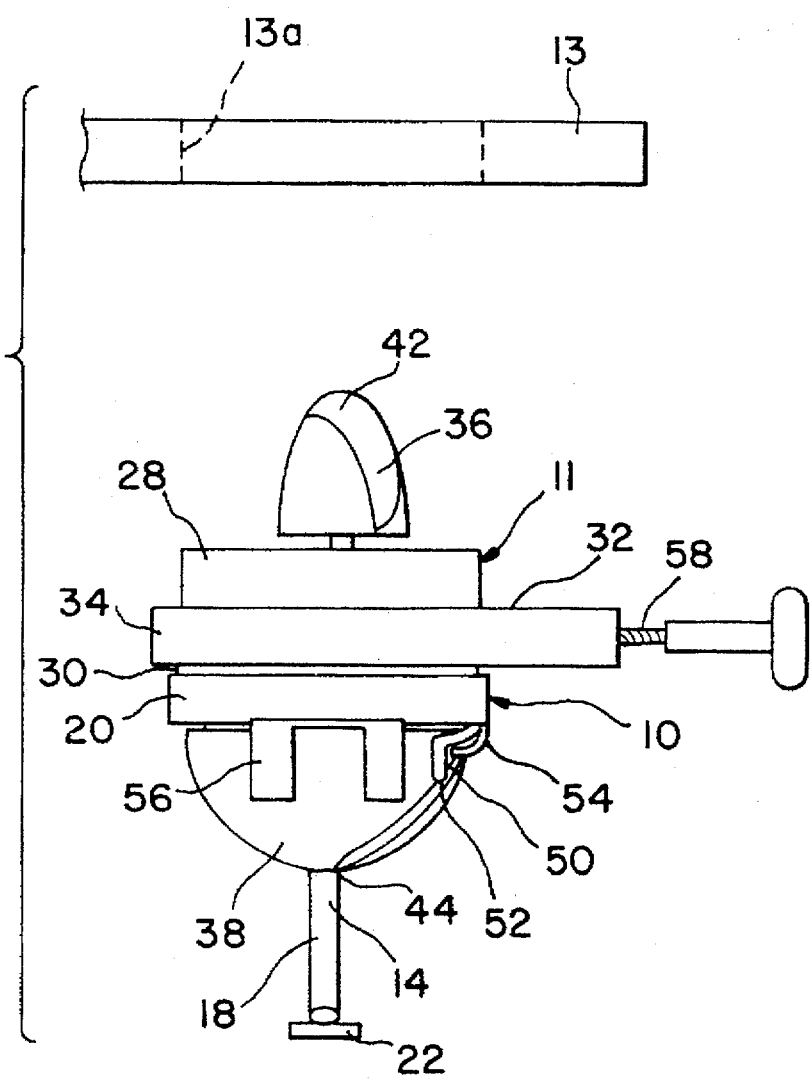
FIG. 3 is an exploded end view of the swivel stacking pin tool of FIG. 1 taken from the right end thereof (as seen in FIG. 1), with the self-locking swivel stacking pin of FIG. 1 being held by the swivel stacking pin tool and a plate of a container being exploded therefrom.

Describing operation of the self-locking swivel stacking pin tool 10 used in this invention, an operator grips the handgrip 18 and allows the pin-housing engaging member 20 to hang downwardly, with the locking-head actuator 14 also being caused, by gravity or by manipulation of the trigger 48, to move downwardly until the trigger 48 hits an edge defining the trigger opening 24. In this position, the tip 52 of the locking-head rotator 50 is outside of an opening defined by the pin-housing engaging member 20. The operator then manipulates the elongated handle 12 so as to move the rectangularly-shaped pin-housing engaging member 20 about a bottom swivel locking head 38 and a bottom insert section 30 of a swivel stacking pin 11, as shown in FIG. 3. In order to get a swivel stacking pin in a proper position for doing this, the operator can manipulate the swivel stacking pin 11 with the bent fork 56. He can then hold the swivel stacking pin 11 with his foot while he manipulates the swivel stacking pin tool 10 to move the pin-housing engaging member 20 onto the bottom insert section 30. While the operator is moving the pin-housing engaging member 20 past the bottom swivel locking head 38 he can rotate the bottom swivel locking head 38 with the pin-housing engaging member 20 to bring it into alignment with a rectangular cavity 20a defined by the pin-housing engaging member 20 while he holds the housing 32 steady with his foot. Once the operator has moved the pin-housing engaging member 20 past the lateral wings, or outer tips, 38a and 38b of the bottom swivel locking head 38, the lateral wing 38a engages the guiding protrusion 21 and the lateral wing 38b engages the locking-head rotator 50. These members continue to hold the bottom swivel locking head 38 in alignment with a cavity 20a defined by the pin-housing engaging member 20. Once the pin-housing engaging member 20 is seated on the bottom insert section 30, as is shown in FIG. 3, the tip 52 of the locking-head rotator 50 is on the far side of the lateral wing 38b of the bottom swivel locking head 38.

The operator then grips the trigger 48 with the same hand holding the handgrip 18 and pulls the trigger 48 toward the handgrip 18. This pulls the tip 52 of the locking-head rotator 50 into the opening 20a defined by the pin-housing engaging member 20 and thereby rotates the bottom swivel locking head 38, the attached axle 40 and the top swivel locking head 36 in a clockwise direction as seen in FIG. 2. When the bottom swivel locking head 38 is thusly rotated, it locks the swivel stacking pin 11 to the pin-housing engaging member 20 of the swivel stacking pin tool 10. This locking takes place because the height H1 of the pin-housing engaging member 20 is approximately the same as the height H2 of the bottom insert section 30 so that the lateral tips 38a and b of the bottom swivel locking head 38 can extend beyond the walls of the pin-housing engaging member 20, and thereby latch the swivel stacking pin 11 to the pin-housing engaging member 20. While the swivel stacking pin 11 is thusly latched to the swivel stacking pin tool 10, the swivel stacking pin tool 10 can be manipulated to manipulate the swivel stacking pin 11 as desired. At the same time, this pulling motion of the trigger 48 also rotates the top swivel locking head 36 so that it becomes aligned with the top insert section 28. In this regard, in FIG. 3 the trigger is not pulled so that the top swivel locking head 36 is not aligned with the top insert section 28. In any event, once the top swivel locking head 36 is aligned with the top insert section 28, the operator can, using the swivel stacking pin tool 10, manipulate the swivel stacking pin 11 so that the top swivel locking head 36 and the top insert section 28 pass through the container plate hole 13a. The operator then releases the trigger 48 and the spring in the housing 32 rotates the axle 40 to rotate the top swivel locking head 36 until it is locked onto the container plate 13. In this position the bottom swivel locking head 38 is not aligned with the bottom insert section 30, but can be automatically brought into such alignment by lowering it into a container plate hole 13a.

Another use of the swivel stacking pin tool used in this invention is to remove self-locking swivel stacking pins from containers which are being held up by cranes. When this is done, it is normally necessary for an operator to first manually manipulate the trigger 48 to move the locking-head rotator 50 outside of the opening 20a defined by the pin-housing engaging member 20. The operator then manipulates the elongated handle 12 so as to move the rectangularly-shaped pin-housing engaging member 20 about a bottom swivel locking head 38 and a bottom insert section 30 of a swivel stacking pin 11 which is mounted on the bottom of a container. The operator then pulls the trigger 48, with the same hand holding the handgrip 18, towards the handgrip 18 to unlock the swivel stacking pin from the container.

It will be appreciated by those of ordinary skill in the art that when an operator uses the swivel stacking pin tool for this invention to manipulate a swivel stacking pin into, or out of, a container plate hole he does not have to stand, or place a hand, directly under a container, which is much safer for the operator. Similarly, the operator does not have to get unduly close to a container held by a crane.

Another benefit of employing the swivel stacking pin tool in the method of this invention is that the tool makes it far easier for an operator to rotate the top swivel locking head 36 to align it with the top insert section 28 than was possible with the tether crank-mechanism 58 provided on the swivel stacking pin.

A similar benefit is derived by having the height H1 of the pin-housing engaging member 20 approximately the same as the height H2 of the top and bottom insert sections 28 and 30 because in this manner, when the pin-housing engaging member 20 of the swivel stacking pin tool 10 is positioned on one of the top and bottom insert sections 28 and 30, and the trigger 48 is pulled to thereby pull the locking-head rotator 50 and rotate the swivel locking head 36, 38, the swivel stacking pin tool 10 is locked, or latched, to the swivel stacking pin tool 10. That is, in this position, the swivel locking head 36 or 38 is on one side of the pin-housing engaging member 20 and the spacer section 34 is on the other side thereof to thereby lock the swivel stacking pin 11 to the swivel stacking pin tool 10. Thus, the swivel stacking pin tool 10 can be used to manipulate the swivel stacking pin 11 as desired without fear of the swivel stacking pin 11 falling out of the swivel stacking pin tool 10.

Yet another benefit of the method of this invention is that the tool can be easily used to lift swivel stacking pins from a deck and to simultaneously rotate their top and bottom swivel locking heads.

As mentioned above, the bent fork 56 is quite beneficial because an operator can use it for manipulating swivel stacking pins when they are lying on the ground or a deck to get them in proper positions for engaging them with the pin-housing engaging member 20. However, the bent fork 56 is also beneficial in that it extends outwardly from the pin-housing engaging member 20 so that it contacts the ground when the swivel stacking pin tool 10 is in a vertical position, holding a swivel stacking pin. The combined swivel stacking pin and swivel stacking pin tool thus contact the ground at two spaced places: at the bent fork 56 and at the housing 32. This two-point contact with the ground helps balance the elongated handle in this vertical position, even if a worker removes his hand from the swivel stacking pin tool. Otherwise, the weight of the elongated handle 12 of the tool could cause the entire combination to easily fall over. Similarly, the bent fork 56 sticks out to provide a spacing of the pin-housing engaging member 20 from the ground so that its position corresponds approximately to that of the bottom insert section 30. Since outer teeth of the bent fork 56 are shaped somewhat like sled runners, the bent fork 56 aids a worker in sliding the swivel stacking pin tool 10 along the floor to place the insert section 28 or 30 into the pin-housing engaging member 20. Thus, it is beneficial that the bent fork sticks out from the pin-housing engaging member about the same distance as the spacer section 34 sticks out from the rest of the housing. Finally, the bent fork 56 is important because it can be used to grip a handle 60 of the tether crank mechanism 58 for pulling it to thereby unlock a swivel stacking pin.

While the invention has been particularly shown and described with reference to a preferred embodiment, it will be understood by those of ordinary skill in the art that various changes in form and detail may be made therein without departing from the spirit and scope of the invention. In this regard, the top and bottom insert sections 28 and 30 and the top and bottom swivel locking heads 36 and 38 are interchangeable. That is, the pins could be manipulated with the swivel stacking pin tool 10 used in this invention when they are turned up-side-down if some changes were made to the swivel stacking pin tool 10. Thus, the terms "top" and "bottom", as used herein for the swivel stacking pin 11 are relative terms and do not necessarily refer to specific orientations. Also, self-locking swivel stacking pin tools used in this invention could be power driven to drive the locking head rotator 50.

Although, the swivel stacking pin tool employed in this invention is described above as being used to pick up swivel stacking pins from a floor, it should be understood that pins can also be hand inserted into the tool and that the tool can be used for removing pins from boxes.

The invention claimed is:

1. A method of making an assemblage of cargo containers including the steps of inserting swivel stacking pins in a second cargo container and then placing the second cargo container on a first cargo container so that the swivel stacking pins are also inserted into the first cargo container, so that said swivel stacking pins are employed to provide spacing support for stacking said second cargo container on the first cargo container, said swivel stacking pins being of a type comprising a pin housing with a spacer section and top and bottom insert sections on opposite sides of the spacer section, top and bottom swivel locking heads respectively on opposite sides of the housing adjacent the respective top and bottom insert sections, and a rotatable axle rigidly attached to the swivel locking heads mounted for rotation in the housing, said insert sections and said swivel locking heads being elongated in a direction perpendicular to said rotatable axle, said method further including the sub steps of:

Providing a swivel stacking pin tool having:
an elongated handle including an elongated shaft with a handgrip at a hand end thereof and a pin-housing engaging member at a pin end thereof for engaging a pin housing of a swivel stacking pin near a bottom swivel-locking head thereof and allowing an operator to manipulate the swivel stacking pin with the elongated handle;
a locking-head actuator having an elongated force-transmittal portion extending along said elongated shaft of said elongated handle and being slidably mounted thereon, a trigger attached to a hand end of said force-transmittal portion close to the handgrip, and a locking-head rotator attached to a pin end of the elongated force-transmittal portion for engaging the bottom swivel locking head;

Using said swivel stacking pin tool to mount each swivel stacking pin on the second cargo container by the substeps of:
manipulating said elongated handle to bring said pin-housing engaging member into engagement with the bottom insert section of said housing of each said swivel stacking pin at said bottom swivel locking head;
manipulating said trigger to cause said rotatable axle to rotate and thereby cause said top swivel locking head to rotate into alignment with the top housing insert section;
inserting the top swivel locking head and the top housing insert section into a hole in said second cargo container by manipulating said swivel stacking pin tool;
manipulating said trigger to allow said rotatable axle to rotate and thereby cause said top swivel locking head to rotate out of alignment with the top housing insert section and thereby lock onto said second cargo container.

2. A method as in claim 1 wherein said pin housing engaging member of said swivel stacking pin tool provided is a frame having the shape of the bottom insert section of the housing and being open on both sides.

3. A method as in claim 2 wherein said elongated shaft of said swivel stacking pin tool provided is tubularly shaped and the elongated force-transmittal portion of the locking-head actuator passes through a bore thereof.

4. A method as in claim 3 wherein said elongated locking-head actuator of said swivel stacking pin tool provided is a single rigid member having bends to form said trigger and said locking-head rotator.

5. A method as in claim 4 wherein said trigger and handgrip of said swivel stacking pin tool provided extend substantially at right angles to the elongated handle.

6. A method as in claim 5 wherein said manipulation of said trigger to cause said top swivel locking head to rotate into alignment with the top housing insert section includes the substep of rotating the first bottom locking head by moving said trigger towards said handgrip.

7. A method as in claim 2 wherein said elongated locking-head actuator of said swivel stacking pin tool provided is a single rigid member having bends to form said trigger and said locking-head rotator.

8. A method as in claim 7 wherein said trigger and handgrip extend substantially at right angles to the elongated handle.

9. A method as in claim 8 wherein said manipulation of said trigger to cause said top swivel locking head to rotate into alignment with the top housing insert section includes the substep of rotating the first bottom locking head by moving said trigger towards said handgrip.

10. A method as in claim 1 wherein said elongated shaft of said swivel stacking pin provided is tubularly shaped and the elongated force-transmittal portion of the locking-head actuator passes through a bore thereof.

11. A method as in claim 10 wherein said elongated locking-head actuator of said swivel stacking pin provided is a single rigid member having bends to form said trigger and said locking-head rotator.

12. A method as in claim 11 wherein said trigger and handgrip extend substantially at right angles to the elongated handle.

13. A method as in claim 1 wherein said elongated locking-head actuator of said swivel stacking pin provided is a single rigid member having bends to form said trigger and said locking-head rotator.

14. A method as in claim 13 wherein said trigger and handgrip extend substantially at right angles to the elongated handle.

15. A method as in claim 1 wherein said manipulation of said trigger to cause said top swivel locking head to rotate into alignment with the top housing insert section includes the substep of rotating the first bottom locking head by moving said trigger towards said handgrip.

16. A method as in claim 1 wherein said swivel stacking pin provided includes a bent fork extending linearly outwardly from said pin-housing engaging member, away from said handgrip.

17. A method as in claim 1 wherein said substep of manipulating said elongated handle to bring said pin-housing engaging member into engagement with the bottom insert section of said housing of each swivel stacking pin is carried out while said swivel stacking pin is on a floor and said swivel stacking tool is then used to lift said swivel stacking pin from said floor.

18. A method as in claim 17 wherein said swivel stacking pin provided includes a fork extending from said pin-housing engaging member and wherein said swivel stacking pin on said floor is moved by said fork to orient said swivel stacking pin prior to said pin-housing engaging member being brought into engagement with the bottom insert section of said housing of said swivel stacking pin.

19. A method as in claim 18 wherein said pin housing engaging member of said swivel stacking pin tool provided is a frame having the shape of the bottom insert section of the housing and being open on both sides, and wherein, before said swivel stacking pin is lifted from said floor, said trigger is pulled toward said handle for rotating said rotatable axle to rotate said bottom swivel-locking head, and thereby locking said swivel stacking pin to said pin-housing engaging member.

20. A method as in claim 17 wherein said pin housing engaging member of said swivel stacking pin tool provided is a frame having the shape of the bottom insert section of the housing and being open on both sides, and wherein, before said swivel stacking pin is lifted from said floor, said trigger is pulled toward said handle for rotating said rotatable axle to rotate said bottom swivel-locking head, and thereby locking said swivel stacking pin to said pin-housing engaging member.

* * * * *